United States Patent
Kim et al.

(10) Patent No.: US 8,477,208 B2
(45) Date of Patent: Jul. 2, 2013

(54) DIGITAL IMAGE PROCESSING APPARATUS TO SIMULATE AUTO-FOCUS, METHOD OF CONTROLLING THE APPARATUS, AND RECORDING MEDIUM HAVING RECORDED THEREON A PROGRAM FOR EXECUTING THE METHOD

(75) Inventors: Dong-min Kim, Suwon-si (KR); Hong-ju Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 275 days.

(21) Appl. No.: 12/712,290

(22) Filed: Feb. 25, 2010

(65) Prior Publication Data
US 2010/0214437 A1 Aug. 26, 2010

(30) Foreign Application Priority Data
Feb. 25, 2009 (KR) .................. 10-2009-0015865

(51) Int. Cl.
*H04N 5/228* (2006.01)
*H04N 9/73* (2006.01)
*H04N 5/232* (2006.01)
*G03B 13/00* (2006.01)

(52) U.S. Cl.
USPC ............ 348/222.1; 348/223.1; 348/346; 348/350

(58) Field of Classification Search
USPC .............. 348/222.1, 223.1, 346, 350
See application file for complete search history.

(56) References Cited

U.S. PATENT DOCUMENTS

| | | | | |
|---|---|---|---|---|
| 4,731,864 A | * | 3/1988 | Modla | 382/255 |
| 5,132,798 A | * | 7/1992 | Yoshimura et al. | 348/239 |
| 5,258,747 A | * | 11/1993 | Oda et al. | 345/602 |
| 5,594,676 A | * | 1/1997 | Greggain et al. | 708/300 |
| 6,034,690 A | * | 3/2000 | Gallery et al. | 345/419 |
| 6,417,880 B1 | * | 7/2002 | Uomori et al. | 348/42 |
| 6,590,574 B1 | * | 7/2003 | Andrews | 345/419 |
| 7,272,252 B2 | * | 9/2007 | De La Torre-Bueno et al. | 382/133 |
| 7,623,726 B1 | * | 11/2009 | Georgiev | 382/255 |
| 7,720,371 B2 | * | 5/2010 | Hong et al. | 396/121 |
| 7,894,524 B2 | * | 2/2011 | Demos | 375/240.15 |
| 7,961,970 B1 | * | 6/2011 | Georgiev | 382/255 |
| 2001/0033327 A1 | * | 10/2001 | Uomori et al. | 348/47 |
| 2002/0024592 A1 | * | 2/2002 | Uomori et al. | 348/42 |
| 2003/0189568 A1 | * | 10/2003 | Alkouh | 345/422 |
| 2005/0018082 A1 | * | 1/2005 | Larsen et al. | 348/563 |
| 2005/0062888 A1 | * | 3/2005 | Wood et al. | 348/553 |
| 2005/0247867 A1 | * | 11/2005 | Volgt et al. | 250/252.1 |
| 2006/0005146 A1 | * | 1/2006 | Arcas | 715/802 |
| 2006/0181549 A1 | * | 8/2006 | Alkouh | 345/629 |
| 2007/0047505 A1 | * | 3/2007 | Wassingbo | 370/338 |
| 2007/0171282 A1 | * | 7/2007 | Yanagi | 348/207.99 |

(Continued)

FOREIGN PATENT DOCUMENTS
JP 2007-233312 A 9/2007

*Primary Examiner* — Chia-Wei A Chen
(74) *Attorney, Agent, or Firm* — Drinker Biddle & Reath LLP

(57) ABSTRACT

Provided are a digital image processing apparatus and a method of controlling the apparatus, and more particularly, is a digital image processing apparatus which embodies a focusing screen digitally instead of optically, and a method of controlling the apparatus. The digital image processing apparatus includes: a lens; a photographing device obtaining data of an original image from light which has passed through the lens; and a digital signal processor performing a blurring treatment on the original image obtained from the photographing device and displaying the original image.

20 Claims, 9 Drawing Sheets

U.S. PATENT DOCUMENTS

| | | | |
|---|---|---|---|
| 2007/0229695 A1* | 10/2007 | Kato | 348/333.12 |
| 2007/0252074 A1* | 11/2007 | Ng et al. | 250/208.1 |
| 2008/0007631 A1* | 1/2008 | Abe | 348/231.3 |
| 2008/0198243 A1* | 8/2008 | Kijima | 348/231.99 |
| 2008/0284859 A1* | 11/2008 | Lee | 348/208.1 |
| 2009/0016438 A1* | 1/2009 | McDade et al. | 375/240.16 |
| 2009/0102841 A1* | 4/2009 | Clavadetscher | 345/420 |
| 2009/0109341 A1* | 4/2009 | Oguz et al. | 348/625 |
| 2009/0115858 A1* | 5/2009 | Lee | 348/208.4 |
| 2009/0115859 A1* | 5/2009 | Lee | 348/208.4 |
| 2009/0131106 A1* | 5/2009 | Itoh et al. | 455/556.1 |
| 2009/0135292 A1* | 5/2009 | Muramatsu | 348/349 |
| 2009/0297042 A1* | 12/2009 | Nair et al. | 382/216 |
| 2010/0066745 A1* | 3/2010 | Tsuda et al. | 345/473 |
| 2010/0111434 A1* | 5/2010 | Madden | 382/255 |
| 2010/0134517 A1* | 6/2010 | Saikaly et al. | 345/619 |
| 2010/0165152 A1* | 7/2010 | Lim | 348/240.99 |
| 2010/0172474 A1* | 7/2010 | Vogt et al. | 378/98.12 |
| 2010/0188396 A1* | 7/2010 | Mejdrich et al. | 345/419 |
| 2010/0214483 A1* | 8/2010 | Gann et al. | 348/578 |
| 2011/0096187 A1* | 4/2011 | Steinberg et al. | 348/222.1 |

\* cited by examiner

FOCUS AREA

DISPLAY FOCUS BY AREA

DIGITAL IMAGE PROCESSING APPARATUS TO SIMULATE AUTO-FOCUS, METHOD OF CONTROLLING THE APPARATUS, AND RECORDING MEDIUM HAVING RECORDED THEREON A PROGRAM FOR EXECUTING THE METHOD

CROSS-REFERENCE TO RELATED PATENT APPLICATION

This application claims the benefit of Korean Patent Application No. 10-2009-0015865, filed on Feb. 25, 2009, in the Korean Intellectual Property Office, the disclosure of which is incorporated herein in its entirety by reference.

BACKGROUND

The present invention relates to a digital image processing apparatus and a method of controlling the apparatus, and more particularly, to a digital image processing apparatus which embodies a focusing screen digitally instead of optically, and a method of controlling the apparatus.

In general, digital image processing apparatuses process images captured by digital cameras, personal digital assistants (PDAs), phone cameras, and personal computer (PC) cameras or employ motion recognition sensors. A digital image processing apparatus may receive a desired image via a photographing device, display the received image on an image display device, store the image as an image file according to a selection of a user, and print the stored image file.

Recently, among the digital image processing apparatuses, a digital single lens reflex (DSLR) camera which can capture a professional image is widely being used. The DSLR camera is a single-lens reflex camera which takes digital photos. Here, the single lens reflex is a design that sends a subject to a viewfinder or sends light to a sensor which takes a photo via one lens.

FIG. 1 illustrates a conventional DSLR camera 10.

Referring to FIG. 1, in the conventional DSLR camera 10, a mirror 12 is rotatably disposed on an optical axis of a lens 11 within a predetermined range of angle about its rotation axis. Light of a subject sent from the lens 11 is normally reflected by the mirror 12 and is focused on a focusing screen 13. A photographer can see an image of the subject focused on the focusing screen 13 through a pentaprism 14 and a viewfinder 15. At this time, when a shutter-release signal is input to the conventional DSLR camera 10, the mirror 12 rotates within a predetermined range of angle about its rotation axis, and the mirror 12 rises in order to be separated from the optical axis of the lens 11. When a shutter 16 is opened by the control of a shutter driving circuit, an image of a subject is formed on a photographing device 17.

As such, the conventional DSLR camera 10 generally includes the focusing screen 13 by which a user confirms the focus to the subject. The focusing screen 13 may include various types of screens, for example, screens for composition determination, for macro photographing, for general photographing, etc., and among those screens, the user may selectively use one that suits his or her taste.

By using the focusing screen 13, when a focus is not adjusted, a subject is displayed blurry, and then when the focus is adjusted, the subject is gradually displayed clearly. Accordingly, the user can visually sense that the focus is being adjusted precisely.

However, since a general digital image processing apparatus, not including a pentaprism or a mirror box, does not include a focusing screen, a user cannot visually sense that a focus is being adjusted precisely, and thus the user may be inconvenienced.

SUMMARY

The present invention provides a digital image processing apparatus which embodies a focusing screen digitally instead of optically, and a method of controlling the apparatus.

According to an aspect of the present invention, there is provided a digital image processing apparatus including: a lens; a photographing device that obtains data of an original image from light which has passed through the lens; and a digital signal processor that sequentially performs a blurring treatment on the original image obtained from the photographing device and displaying the original image.

The digital signal processor may sequentially perform a blurring treatment so that the image is gradually displayed clearly.

The digital signal processor may display the image while sequentially reducing the amount of blurring treatment performed on the image.

The digital signal processor may combine a screen in which the blurring treatment is performed on the original image and an on screen display (OSD) screen in which a focusing screen is displayed.

The digital signal processor may include: an original image processor that performs a blurring treatment on the original image; an OSD processor that creates a focusing screen; and an image combiner that combines the image blurred in the original image processor and the focusing screen created in the OSD processor.

The original image processor may perform a blurring treatment so that the sharpness of the original image is sequentially changed.

The OSD processor may sequentially change the brightness, color, or chroma of the focusing screen.

The digital image processing apparatus may include a plurality of the focusing screens so as to be selected according to input of a user.

The focusing screen may include a plurality of layers.

The focusing screen may include at least one from among a focus area display layer for displaying a focus area and a composition display layer for displaying a composition of an image.

The digital signal processor may perform the blurring treatment on the original image by using at least one from among an average filter, a median filter, and a Gaussian filter.

According to another aspect of the present invention, there is provided a method of controlling a digital image processing apparatus, the method including: obtaining data of an original image from a photographing device; and sequentially performing a blurring treatment on the obtained original image and displaying the blurred image.

The sequentially performing of the blurring treatment and the displaying of the image may include sequentially performing a blurring treatment on the original image so that the image is gradually displayed clearly.

The sequentially performing of the blurring treatment and the displaying of the image may include displaying the image by sequentially reducing the amount of blurring treatment.

The sequentially performing of the blurring treatment and the displaying of the original image may include: performing a blurring treatment on the obtained original image; creating a focusing screen; and combining the blurred image and the created focusing screen.

The performing of the blurring treatment may include performing a blurring treatment so that the sharpness of the original image is sequentially changed.

The obtained original image may be sequentially blurred, and at the same time, the brightness, color, or chroma of the focusing screen is sequentially changed.

The focusing screen may include a plurality of layers.

The performing of the blurring treatment may be performed on the original image by using at least one from among an average filter, a median filter, and a Gaussian filter.

According to another aspect of the present invention, there is provided computer readable recording medium having embodied thereon a program for executing any one of the methods.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE EMBODIMENTS

Hereinafter, the present invention will be described more fully with reference to the accompanying drawings, in which exemplary embodiments of the invention are shown.

Figure 1:
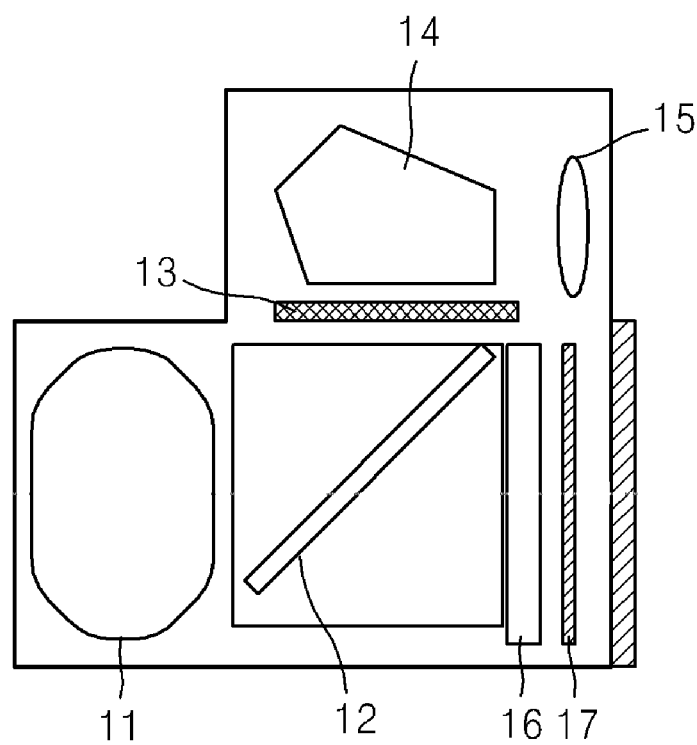
FIG. 1 is a side-view pictorial diagram illustrating a conventional digital single lens reflex (DSLR) camera.
Figure 2:
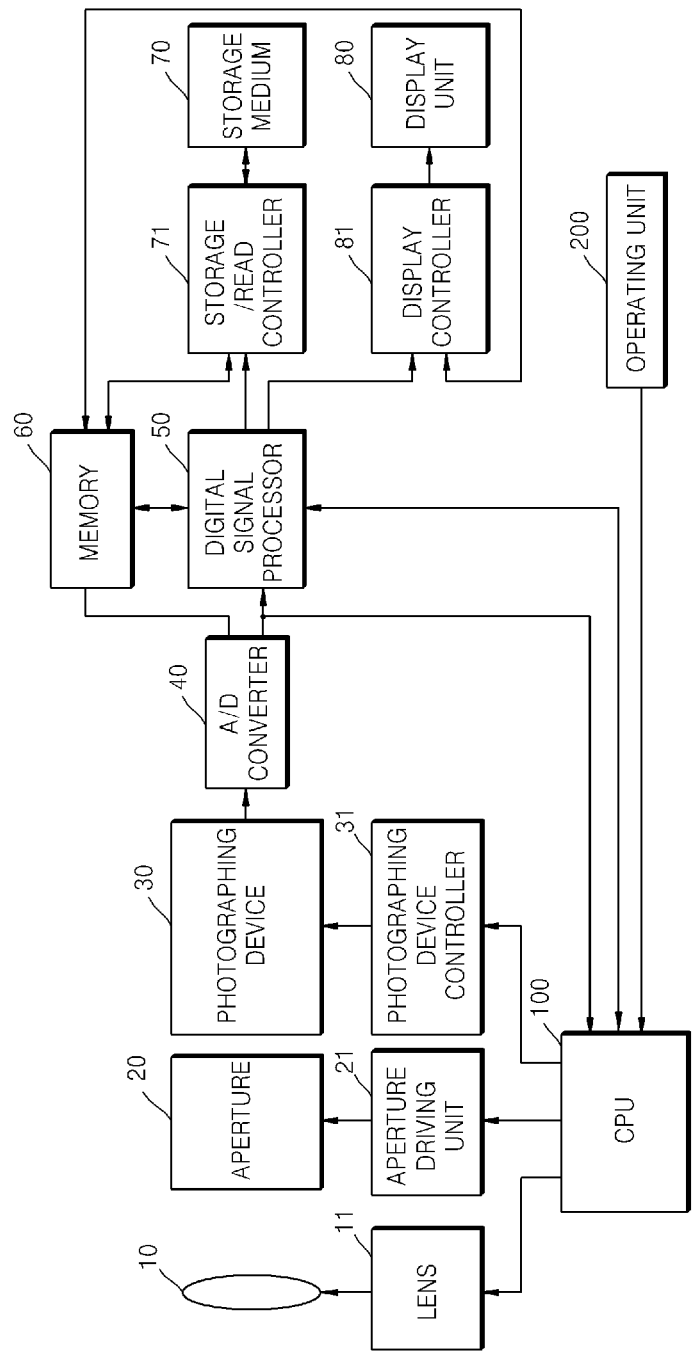
FIG. 2 is a block diagram of a digital image photographing apparatus according to an embodiment of the present invention.

FIG. 2 is a block diagram of a digital image photographing apparatus according to an embodiment of the present invention.

FIG. 2 schematically illustrates a kind of digital photographing apparatus. However, the present invention is not limited to the digital image photographing apparatus illustrated in FIG. 2, and may be applied to an image processing apparatuses, such as a personal digital assistant (PDA), a personal multimedia player (PMP), or the like. This is the same in embodiments and modified examples which will be described later.

A central processor (CPU) 100 controls the operations of the digital image photographing apparatus. The digital image photographing apparatus includes an operating unit 200 including keys for generating an electrical signal by a user. The electrical signal generated in the operating unit 200 is transmitted to the CPU 100 so that the CPU 100 controls the digital image photographing apparatus according to the electrical signal.

When the digital photographing apparatus is in a photographing mode, the CPU 100 determines the received electrical signal so as to control a lens driving unit 11, an aperture driving unit 21, and a photographing device controller 31, and thus, a location of a lens 10, an opening extent of an aperture 20, and a sensitivity of a photographing device 30 are respectively controlled. The photographing device 30 creates data from received light, and an analog-to-digital (A/D) converter 40 converts analog data received from the photographing device 30 into digital data. In the current embodiment, the A/D converter 40 may not be necessary according to the characteristics of the photographing device 30.

The data from the photographing device 30 may be input to a digital signal processor 50 directly or via a memory 60, and may be input to the CPU 100 when required. In the current embodiment, the memory 60 may be a read-only memory (ROM), a random-access memory (RAM), or the like.

Figure 3:
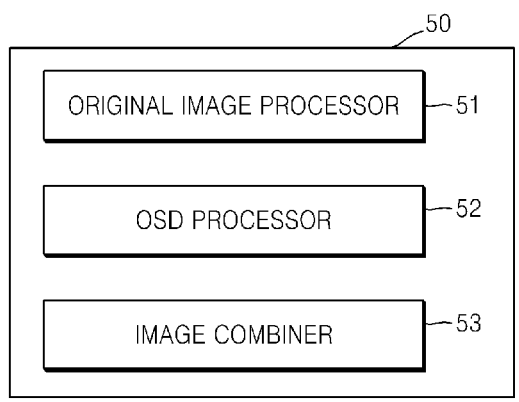
FIG. 3 is a block diagram of a digital signal processor in the digital image photographing apparatus of FIG. 2.

The digital signal processor 50 may perform a digital signal process, for example, gamma correction, white balance adjustment, etc., when required. As illustrated in FIG. 3, the digital signal processor 50 may include an original image processor 51, an on-screen display (OSD) processor 52, and an image combiner 53. Alternately, the original image processor 51, the OSD processor 52, and the image combiner 53 may be formed in various other ways, for example, by being separated from the digital signal processor 50 instead of being included in the digital signal processor 50. That is, the digital image photographing apparatus according to the current embodiment needs to only include the original image processor 51, the OSD processor 52, and the image combiner 53. Operations of the original image processor 51, the OSD processor 52 and the image combiner 53 will be described later.

An image from the data which is output from the digital signal processor 50 is transmitted to a display controller 81 directly or via the memory 60. The display controller 81 controls a display unit 80 to display an image. The data which is output from the digital signal processor 50 is input to a storage/read controller 71 directly or via the memory 60. The storage/read controller 71 stores an image file including the image data in a storage medium 70 automatically or according to a signal from the user. The storage/read controller 71 may read the image data from the image file stored in the storage medium 70, and transmit the read image data to the display controller 81 via the memory 60 or another path, so as to display an image on the display unit 80. The storage medium 70 may be detachable or un-detachable from the digital image photographing apparatus.

Hereinafter, functions of the original image processor 51, the OSD processor 52, and the image combiner 53 will be described with reference to FIG. 3.

FIG. 3 is a block diagram of the digital signal processor 50 in the digital image photographing apparatus of FIG. 2 using, e.g., a face recognition function, according to an embodiment of the present invention. The digital signal processor 50 includes the original image processor 51, the OSD processor 52, and the image combiner 53. The digital signal processor 50 illustrated in FIG. 3 sequentially performs a blurring treatment on an original image obtained by the photographing device 30 and displays the blurred image.

The original image processor 51 performs a blurring treatment by using at least one from among an average filter, a median filter, and a Gaussian filter on the original image. When the original image passes through the filter, data in a high-frequency band, that is, edge data cannot pass through the filter, and only data in a low-frequency band passes through the filter to be blurred. That is, the filter removes fine parts in a low-frequency space, and removes an image having a high-frequency component to remove sharpness, thereby obtaining a blur effect.

Here, the original image processor 51 performs a blurring treatment so that the sharpness of the original image is sequentially changed, that is, sequentially performs the blurring treatment, so that an image displayed on the display unit 80 is displayed blurry in the beginning and then gradually displayed clearly as time passes. Thus, by such sequential blurring treatment, the user can visually sense that a focus is precisely adjusted. The sequential blurring treatment will be described in detail with reference to FIG. 8.

Next, the OSD processor 52 creates a focusing screen to display an image.

FIGS. 4A through 4D illustrate various types of focusing screens respectively. As described above, a focusing screen is embodied and displayed on an OSD.

Figure 4A:
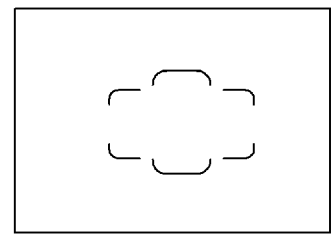
FIGS. 4A through 4D are pictorial diagrams illustrating various types of focusing screens respectively, according to an embodiment of the present invention.
Figure 4B:
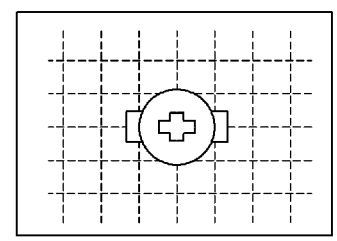
Figure 4C:
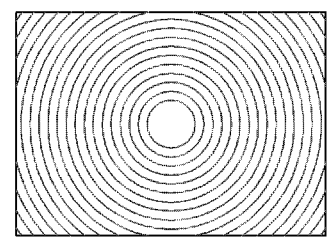
Figure 4D:
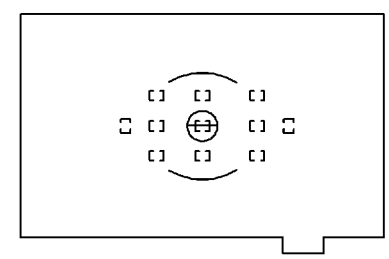

A first focusing screen illustrated in FIG. 4A is effective in determining the composition of a subject, and may be mainly used in photographing using a close-up lens. A second focusing screen illustrated in FIG. 4B can perform a fine composition setting by quadrille compartment lines. In a third focusing screen illustrated in FIG. 4C, a factor for obstructing vision does not exist on a surface of the screen, and thus third focusing screen is good to concentrate on a subject. Finally, a fourth focusing screen illustrated in FIG. 4D is a split-type screen and is suitable for general photographing, and also can adjust a focus precisely and rapidly by using a split formed in the center of the screen and a mat surface. The user can selectively use any one that suits his or her taste from among these various types of focusing screens.

The OSD processor 52 sequentially changes the brightness, color, or chroma of the focusing screen. That is, the OSD processor 52 may sequentially change so that the focusing screen on the OSD which is displayed on the display unit 80 is displayed blurry in the beginning and then gradually displayed clearly as time passes. Alternately, in the focusing screen on the OSD which is displayed on the display unit 80, a focusing area may be displayed in a different color. Alternately, the OSD processor 52 may sequentially change so that the focusing screen on the OSD which is displayed on the display unit 80 is displayed dark in the beginning and then gradually displayed bright as time passes. As such, by the sequential blurring treatment of the focusing screen, the user can visually sense that the focus is being precisely adjusted. The sequential blurring treatment of the focusing screen will be described in detail with reference to FIG. 8.

The image combiner 53 combines the image on which the blurring treatment is performed in the original image processor 51 and the focusing screen created in the OSD processor 52.

Figure 5:
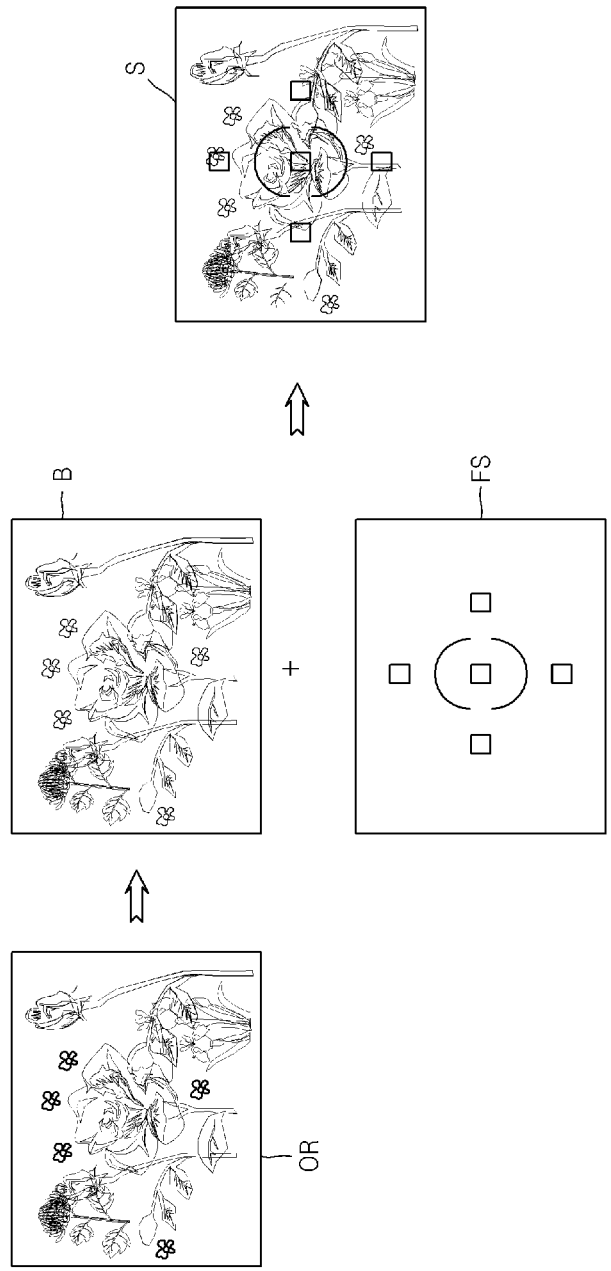
FIG. 5 are pictorial diagrams illustrating processes of performing a blurring treatment on an original image, creating a focusing screen, and combining the blurred image and the focusing screen, according to an embodiment of the present invention.

FIG. 5 illustrates processes of performing a blurring treatment on an original image in the original image processor 51, creating a focusing screen in the OSD processor 52, and combining the blurred image and the focusing screen in the image combiner 53, according to an embodiment of the present invention That is, the original image processor 51 performs a blurring treatment on an original image OR obtained by the photographing device 30, as illustrated in an image B of FIG. 5. The OSD processor 52 creates a focusing screen FS. The image combiner 53 creates and displays an image S by combining the image B blurred in the original image processor 51 and the focusing screen FS created in the OSD processor 52.

The focusing screen displayed on the OSD includes a plurality of layers including a focus area display layer for displaying a focus area and a composition display layer for displaying a composition.

Figure 6A:
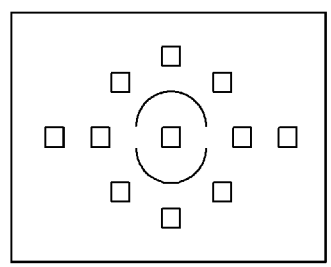
FIGS. 6A and 6B are pictorial diagrams illustrating focus area display layers, according to an embodiment of the present invention.
Figure 6B:
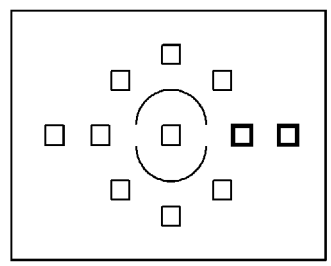

Referring to FIGS. 6A and 6B, the focus area display layer is displayed on an OSD in order to display the focus area on an original image, and may include a plurality of focus areas. The focus area which is in complete focus from among the plurality of focus areas may be blinked or displayed in a different color from other focus areas so as to increase its recognition by the user. That is, the user can visually sense that the focus is being precisely adjusted by sequentially changing the brightness, color, or chroma of the focus area which is in complete focus. For example, in the beginning of the photographing, all of the plurality of focus areas are displayed in the same way as illustrated in FIG. 6A, and then when the digital image processing apparatus faces a specific subject for more than a predetermined period of time, the color or chroma of the focus area which is in complete focus is sequentially changed, and thus the user can visually sense that the focus is being precisely adjusted.

Figure 7A:
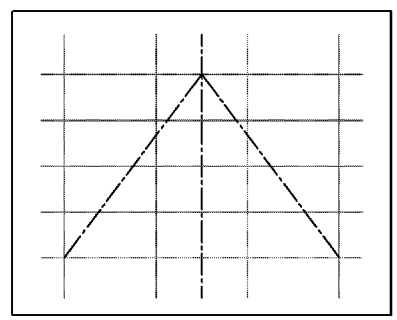
FIGS. 7A through 7C are pictorial diagrams illustrating composition display layers, according to an embodiment of the present invention.
Figure 7B:
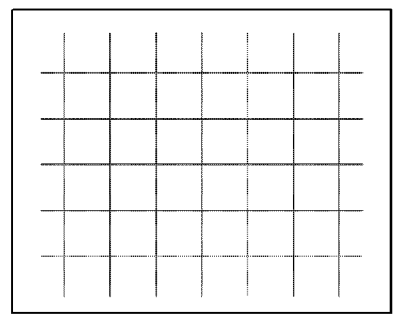
Figure 7C:
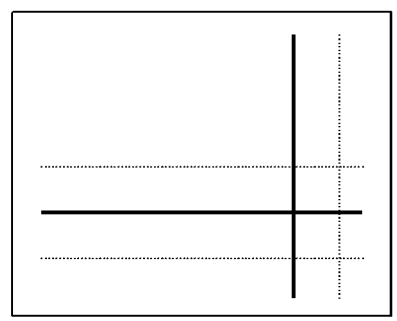

Referring to FIGS. 7A through 7C, the composition display layer is displayed on an OSD in order to display a composition on an original image. The quadrille lines and figures illustrated in FIGS. 7A through 7C are various examples of the composition display layer which allows the user to easily set the composition of a photo, and the user may selectively use one that suits his or her taste from among the various composition display layers. Also, the brightness, color, or chroma of the composition display layer may be sequentially changed, that is, changed so that the composition display layer displayed on the OSD is displayed blurry in the beginning and then gradually displayed clearly as time passes, and alternately, the composition display layer displayed on the OSD is displayed dark in the beginning and then gradually displayed bright as time passes. Thus, the user can visually sense that the focus is being precisely adjusted.

Figure 8A:
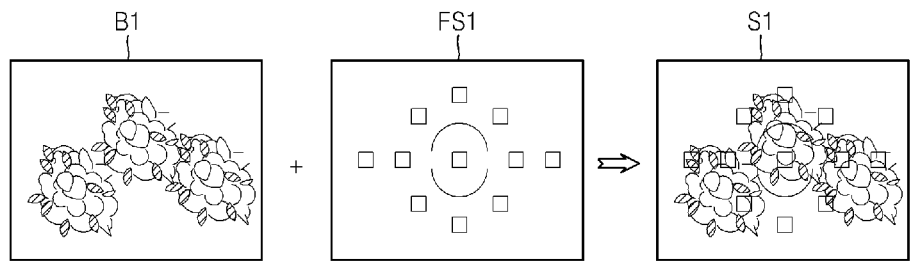
FIGS. 8A through 8C are pictorial diagrams illustrating processes of sequentially performing a blurring treatment in a digital image processing apparatus, according to an embodiment of the present invention.
Figure 8B:
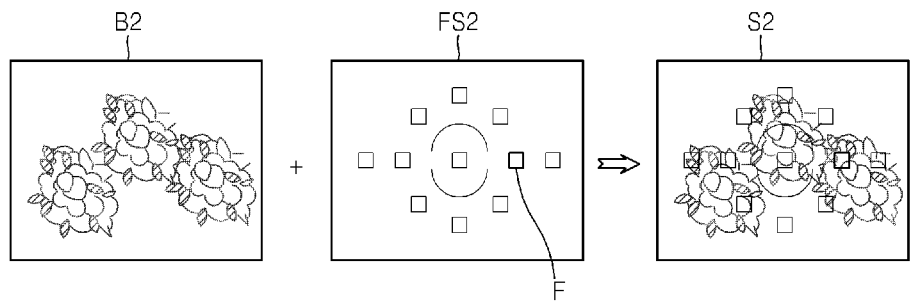
Figure 8C:
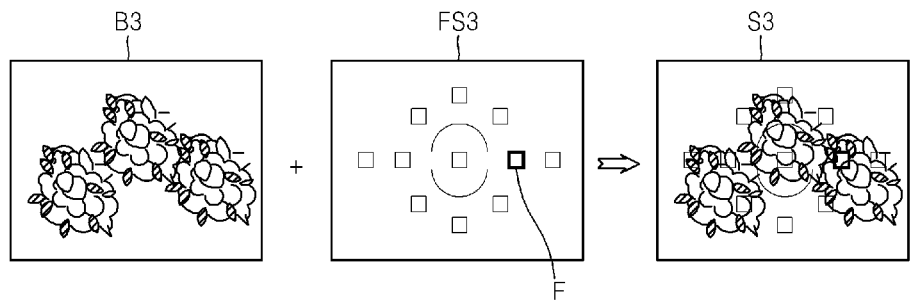

FIGS. 8A through 8C illustrate processes of sequentially performing a blurring treatment in a digital image processing apparatus, according to an embodiment of the present invention.

Referring to FIG. 8A, an original image processor (refer to 51 in FIG. 3) performs a large amount of blurring treatment on an original image in the beginning of photographing, so as to display the original image very blurry. An OSD processor (refer to 53 in FIG. 3) creates a focusing screen FS1 in which all of a plurality of focus areas are displayed in the same way. In this state, the user visually senses that a subject is not in complete focus.

At this time, when the digital image processing apparatus faces a specific subject for more than a predetermined period of time in a state where the composition of the digital image processing apparatus is not changed, the original image processor (refer to 51 in FIG. 3) sequentially reduces the amount of a blurring treatment performed on the original image, so that the original image is gradually displayed clearly. The OSD processor (refer to 53 in FIG. 3) also creates a focusing screen FS2 in which a focus area, which is in complete focus, from among the plurality of focus areas is displayed in a different color from other focus areas.

When this state is maintained for a predetermined period of time, the original image processor (refer to 51 in FIG. 3) does not perform a blurring treatment on the original image or performs a blurring treatment having a value close to 0, so that a clear image which is actually the same as the original image is displayed. Also, the OSD processor (refer to 53 in FIG. 3) may change the color of the focus area which is in complete focus into a color having a higher visibility or thickens an circumference of the focus area, so that the focus area which is in complete focus from among the plurality of focus areas is more clearly displayed.

According to the present invention, a focusing screen is embodied digitally instead of optically by performing a sequential blurring treatment, so that even when the user uses a general digital image processing apparatus instead of a DSLR camera, the user can visually sense a process for adjusting a focus. Accordingly, the user of the digital image processing apparatus can be provided with an increased convenience.

Figure 9:
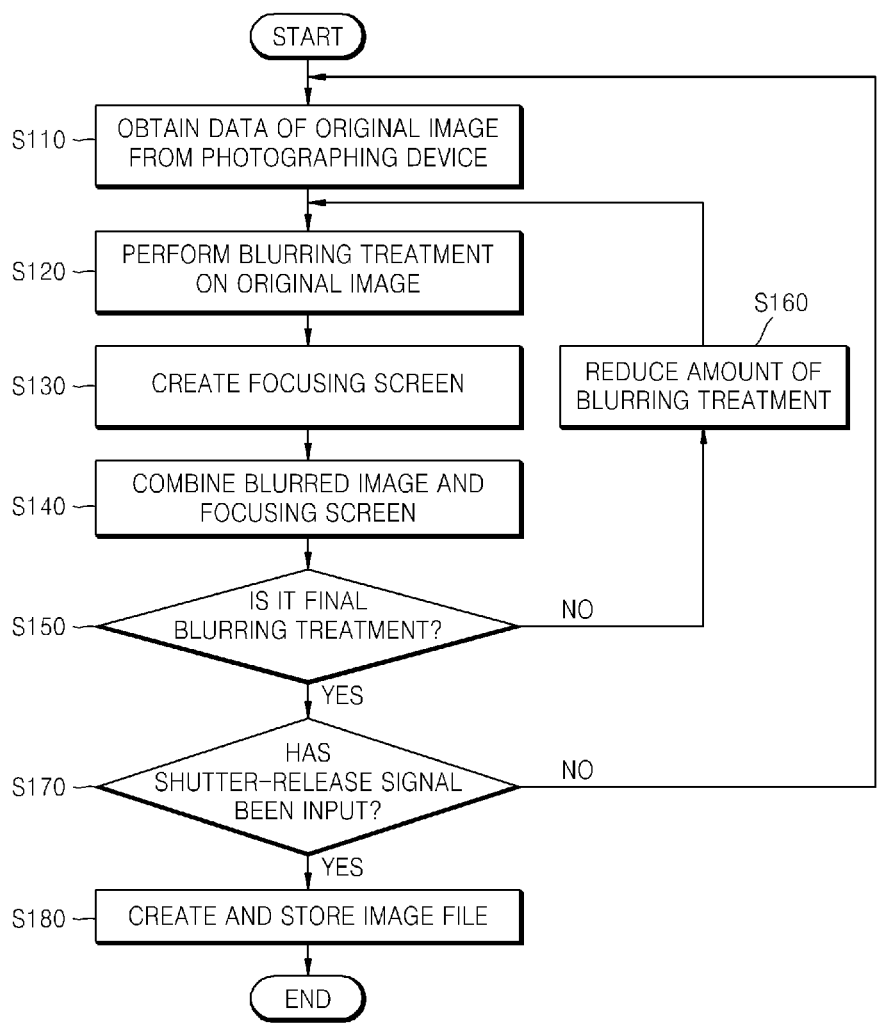
FIG. 9 is a flowchart of a method of controlling a digital image processing apparatus according to an embodiment of the present invention.

FIG. 9 is a flowchart of a method of controlling a digital image processing apparatus according to an embodiment of the present invention. The method may be performed in the digital image processing apparatus illustrated in FIGS. 2 and 3, and a main algorithm of the method may be performed in a digital signal processor by the aid of peripheral components in the digital image photographing apparatus according to the present embodiment.

Referring to FIG. 9, the method includes the following operations. Data of an original image is obtained in a photographing device (S110), and a blurring treatment is performed on the obtained original image (S120). Then, a focusing screen is created (S130), and the blurred original image and the created focusing screen are combined (S140). Next, it is determined whether the blurring treatment is a final blurring treatment or not (S150). As a result of the determining, if the blurring treatment is not a final blurring treatment, the amount of blurring treatment is reduced (S160). Then, it is determined whether a shutter-release signal has been input or not (S170), and an image file is created and stored (S180).

In detail, the photographing device creates data from received light, and an A/D converter converts analog data received from the photographing device into digital data. The data received from the photographing device is input to a digital signal processor via a memory (S110).

Next, the digital signal processor performs a blurring treatment on the obtained original image (S120). In detail, the original image processor of the digital signal processor performs the blurring treatment on the original image by using at least one from among an average filter, a median filter, and a Gaussian filter. When the original image passes through the filter, data in a high-frequency band, that is, edge data, does not pass through the filter, and only data in a low-frequency band passes through the filter to be blurred. That is, the filter removes fine parts in a low-frequency space and removes an image having a high-frequency component in order to eliminate sharpness, thereby obtaining a blur effect.

Next, the digital signal processor creates a focusing screen (S130). Here, the focusing screen displayed on an OSD includes a plurality of layers, including a focus area display layer for displaying a focus area and a composition display layer for displaying a composition.

The focus area display layer is displayed on an OSD in order to display the focus area on an original image, and may include a plurality of focus areas. The focus area which is in complete focus from among the plurality of focus areas may be blinked or displayed in a different color from other focus areas so as to increase its recognition by the user. That is, the user can visually sense that the focus is being precisely adjusted by sequentially changing the brightness, color, or chroma of the focus area which is in complete focus.

The composition display layer is displayed on an OSD in order to display a composition on an original image. The user may selectively use one that suits his or her taste from among the various composition display layers. The brightness, color, or chroma of the composition display layer may be sequentially changed. That is, the composition display layer displayed on the OSD is displayed blurry in the beginning and then gradually displayed clearly as time passes, and, alternately, the composition display layer displayed on the OSD is displayed dark in the beginning and then gradually displayed bright as time passes. Thus, the user can visually sense that the focus is being precisely adjusted.

Next, the digital signal processor combines the blurred image and the created focusing screen (S140). In detail, the image combiner of the digital signal processor combines the blurred image in the original image processor and the focusing screen created in the OSD processor.

Next, it is determined whether the blurring treatment is a final blurring treatment or not (S150).

In detail, a focusing screen is embodied digitally instead of optically. For this, a blurring treatment is performed on the original image obtained from the photographing device. The original image processor performs a large amount of blurring treatment on the original image at the beginning of photographing, so as to display the original image very blurry. In this state, the original image processor sequentially reduces the amount of blurring treatment performed on the original image so that the original image is gradually displayed clearly. Therefore, eventually, the original image processor does not perform a blurring treatment on the original image or performs a blurring treatment having a value close to 0, so that a clear image which is actually the same as the original image is displayed.

In order to perform the sequential blurring treatment, the digital signal processor determines whether the current blurring treatment is a final blurring treatment or not (S150).

As a result of the determining, if the current blurring treatment is not a final blurring treatment, the digital signal processor reduces the amount of blurring treatment. That is, the digital signal processor processes the image in order for the image to be displayed more clearly. As such, in a state where the amount of blurring treatment is reduced, S120 through S150 are repeated.

In other words, the digital signal processor performs the blurring treatment so that the sharpness of the original image is sequentially changed. That is, the digital signal processor performs the blurring treatment sequentially so that the image displayed on a display unit is displayed blurry in the beginning and then gradually displayed clearly as time passes. Thus, the user can visually sense that a focus is being precisely adjusted by the sequential blurring treatment.

The digital signal processor sequentially changes the brightness, color, or chroma of a focusing screen, that is, may sequentially change the brightness, color, or chroma of a focusing screen so that the focusing screen on an OSD displayed on the display unit is displayed blurry in the beginning and then gradually displayed clearly. Alternately, in the focusing screen on the OSD displayed on the display unit, a focus area may be displayed in a different color. Alternately, the digital signal processor may sequentially change so that the focusing screen on the OSD displayed on the display unit is displayed dark in the beginning and then gradually displayed bright as time passes. Thus, the user can visually sense that a focus is being precisely adjusted by the sequential blurring treatment of the focusing screen.

The digital signal processor determines whether the current blurring treatment is a final blurring treatment or not (S160). As a result of the determining, if the current blurring treatment is a final blurring treatment, it is determined whether a shutter-release signal has been input or not (S170).

As a result of the determining, if the shutter-release signal is not input, the processes of obtaining the data of the original image from the photographing device, sequentially performing the blurring treatment, and displaying the image are repeated.

As a result of the determining, if the shutter-release signal has been input, the captured image is created as, e.g., a join photographic experts group (JPEG) image file, displayed on the display unit, and stored in a storage unit (S180).

A focusing screen is embodied digitally instead of optically by performing a sequential blurring treatment, so that even when the user uses a general digital image processing apparatus instead of a DSLR camera, the user can visually sense a process for adjusting a focus. Accordingly, the user of the digital image processing apparatus can be provided with an increased convenience.

The device may comprise a processor, a memory for storing program data and executing it, a permanent storage, a communications port for handling communications with external devices, and user interface devices, including a display, buttons, etc. The software modules to implement various processes may be stored as program instructions or computer readable codes executable on the processor on a computer-readable media such as read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. This media can be read by the computer, stored in the memory, and executed by the processor.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, where the elements of the present invention are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the present invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those skilled in this art without departing from the spirit and scope of the present invention.

What is claimed is:

1. A digital image processing apparatus comprising: a lens; a photographing device that obtains data of a through image from light which has passed through the lens; and a digital signal processor that:
   prior to receiving a shutter-release signal, sequentially performs a blurring treatment on the through image obtained from the photographing device,
   sequentially displays the blurred image and the through image to simulate an auto-focus, and
   upon receiving the shutter-release signal, stores an image on a storage medium.

2. The digital image processing apparatus of claim 1, wherein the digital signal processor sequentially performs the blurring treatment so that the image is gradually displayed clearly.

3. The digital image processing apparatus of claim 1, wherein the digital signal processor displays the image while sequentially reducing the amount of blurring treatment performed on the image.

4. The digital image processing apparatus of claim 1, wherein the digital signal processor combines a screen in which the blurring treatment is performed on the through image and an on-screen display (OSD) screen in which a focusing screen is displayed.

5. The digital image processing apparatus of claim 1, wherein the digital signal processor comprises:
   a through image processor that performs the blurting treatment on the through image;
   an on-screen display (OSD) processor that creates a focusing screen; and an image combiner that combines the image blurred in the through image processor and the focusing screen created in the OSD processor.

6. The digital image processing apparatus of claim 5, wherein the through image processor performs the blurting treatment so that the sharpness of the through image is sequentially changed.

7. The digital image processing apparatus of claim 5, wherein the OSD processor sequentially changes at least one of brightness, color, or chroma of the focusing screen.

8. The digital image processing apparatus of claim 5, comprising a plurality of the focusing screens that are user selectable.

9. The digital image processing apparatus of claim 5, wherein the focusing screen comprises a plurality of layers.

10. The digital image processing apparatus of claim 9, wherein the focusing screen comprises at least one of a focus area display layer for displaying a focus area or a composition display layer for displaying a composition of an image.

11. The digital image processing apparatus of claim 1, wherein the digital signal processor performs the blurring treatment on the through image by using at least one of an average filter, a median filter, or a Gaussian filter.

12. A method of controlling a digital image processing apparatus, the method comprising:
   obtaining data of an through image from a photographing device;
   prior to receiving a shutter-release signal, performing a blurring treatment on the obtained through image,
   sequentially displaying the blurred image and the through image to simulate an auto-focus, and
   upon receiving the shutter-release signal, storing an image on a storage medium.

13. The method of claim 12, wherein the sequential performing of the blurring treatment and the displaying of the image comprises sequentially performing the blurring treatment on the through image so that the image is gradually displayed clearly.

14. The method of claim 12, wherein the sequential performing of the blurring treatment and the displaying of the image comprises displaying the image by sequentially reducing the amount of blurring treatment.

15. The method of claim 12, wherein the sequential performing
   of the blurring treatment and the displaying of the through image comprises: performing a blurting treatment on the obtained through image; creating a focusing screen; and combining the blurred image and the created focusing screen.

16. The method of claim 15, wherein the performing of the blurring treatment comprises performing the blurring treatment so that the sharpness of the through image is sequentially changed.

17. The method of claim 15, wherein the obtained through image is sequentially blurred, and at the same time, at least one of brightness, color, or chroma of the focusing screen is sequentially changed.

18. The method of claim 15, wherein the focusing screen comprises a plurality of layers.

19. The method of claim 15, wherein the performing of the blurting treatment is performed on the through image by using at least one of an average filter, a median filter, or a Gaussian filter.

20. A computer program product, comprising a non-transitory computer usable medium having a computer readable program code embodied therein, said computer readable program code adapted to be executed to implement a method for controlling a digital image processing apparatus, the method comprising:
   obtaining data of an through image from a photographing device;
   prior to receiving a shutter-release signal, sequentially performing a blurring treatment on the obtained through image,
   sequentially displaying the blurred image and the through image to simulate an auto-focus, and
   upon receiving the shutter-release signal, storing an image on a storage medium.

\* \* \* \* \*

UNITED STATES PATENT AND TRADEMARK OFFICE
CERTIFICATE OF CORRECTION

PATENT NO. : 8,477,208 B2
APPLICATION NO. : 12/712290
DATED : July 2, 2013
INVENTOR(S) : Kim et al.

It is certified that error appears in the above-identified patent and that said Letters Patent is hereby corrected as shown below:

IN THE CLAIMS:

In Claim 1, Column 10, lines 43-44, replace "sequentially performs a blurring treatment"

with -- performs a blurring treatment --

Signed and Sealed this
Seventeenth Day of September, 2013

Teresa Stanek Rea
*Deputy Director of the UnitedStates Patent and Trademark Office*